United States Patent
Dobler

(10) Patent No.: US 10,656,346 B2
(45) Date of Patent: May 19, 2020

(54) COUPLING FOR FORMING AN OPTICAL PLUG CONNECTION

(71) Applicant: Neutrik AG, Schaan (LI)

(72) Inventor: Oliver Dobler, Tschagguns (AT)

(73) Assignee: Neutrik AG, Schaan (LI)

( * ) Notice: Subject to any disclaimer, the term of this patent is extended or adjusted under 35 U.S.C. 154(b) by 0 days.

(21) Appl. No.: 16/512,720

(22) Filed: Jul. 16, 2019

(65) Prior Publication Data

US 2020/0026007 A1    Jan. 23, 2020

(30) Foreign Application Priority Data

Jul. 17, 2018  (DE) .................. 10 2018 117 223

(51) Int. Cl.
  *G02B 6/38*  (2006.01)
(52) U.S. Cl.
  CPC ......... *G02B 6/3874* (2013.01); *G02B 6/3825* (2013.01)
(58) Field of Classification Search
  CPC .................................................. G02B 6/3874
  USPC .......................................................... 385/72
  See application file for complete search history.

(56) References Cited

U.S. PATENT DOCUMENTS

| | | | |
|---|---|---|---|
| 5,166,995 A | 11/1992 | Briggs et al. | |
| 7,011,454 B2 * | 3/2006 | Caveney | G02B 6/3806 385/59 |
| 8,382,382 B2 * | 2/2013 | Nelson | G02B 6/3865 385/55 |
| 8,403,570 B2 * | 3/2013 | Fisher | G02B 6/3878 385/70 |
| 8,845,205 B2 * | 9/2014 | Nelson | G02B 6/3869 385/55 |
| 9,759,874 B2 | 9/2017 | Petersen | |
| 10,197,741 B2 * | 2/2019 | Nelson | G02B 6/381 |
| 2006/0018603 A1 * | 1/2006 | Greub | G02B 6/3812 385/60 |
| 2010/0054668 A1 * | 3/2010 | Nelson | G02B 6/381 385/78 |

(Continued)

FOREIGN PATENT DOCUMENTS

| | | |
|---|---|---|
| CN | 207586480 | 7/2018 |
| JP | 2001033658 | 2/2001 |

(Continued)

*Primary Examiner* — Sung H Pak
(74) *Attorney, Agent, or Firm* — Volpe and Koenig, P.C.

(57) ABSTRACT

A coupling for forming an optical plug connection between two optical plug connectors, the coupling having a guide sleeve and a sleeve-receiving cage with an interior space for receiving the guide sleeve. The sleeve-receiving cage has plug-in openings arranged opposite one another on a longitudinal axis of the sleeve-receiving cage and which serve for the plugging-in of in each case one ferrule of the respective optical plug connector into the guide sleeve in, in each case, one direction parallel to the longitudinal axis. The plug-in openings each are at least regionally surrounded by longitudinal stops of the sleeve-receiving cage for preventing the guide sleeve from being pulled out of the interior space of the sleeve-receiving cage, and the sleeve-receiving cage having two sleeve-receiving cage parts, and detent connection parts of the sleeve-receiving cage parts are engagable into one another with detent action via the sleeve-receiving cage parts being slid onto one another in a direction parallel to the longitudinal axis.

14 Claims, 6 Drawing Sheets

(56) References Cited

U.S. PATENT DOCUMENTS

| | | | |
|---|---|---|---|
| 2011/0123156 A1 | 5/2011 | Koreeda et al. | |
| 2015/0192744 A1* | 7/2015 | Lin | G02B 6/3807 |
| | | | 385/75 |
| 2016/0324402 A1* | 11/2016 | Yajima | G02B 6/3874 |

FOREIGN PATENT DOCUMENTS

| | | |
|---|---|---|
| WO | 03071329 | 8/2003 |
| WO | 2011128375 | 10/2011 |

* cited by examiner

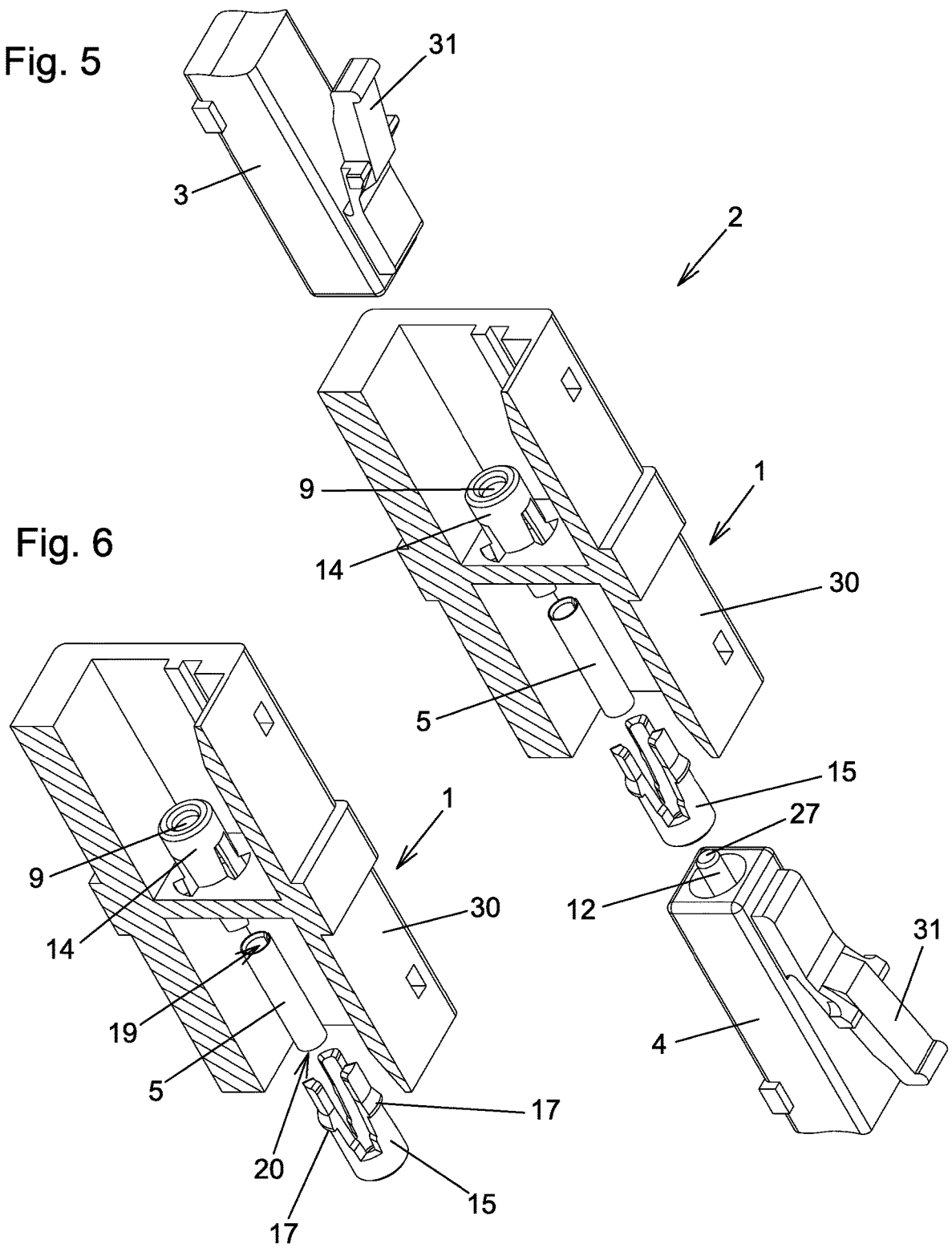

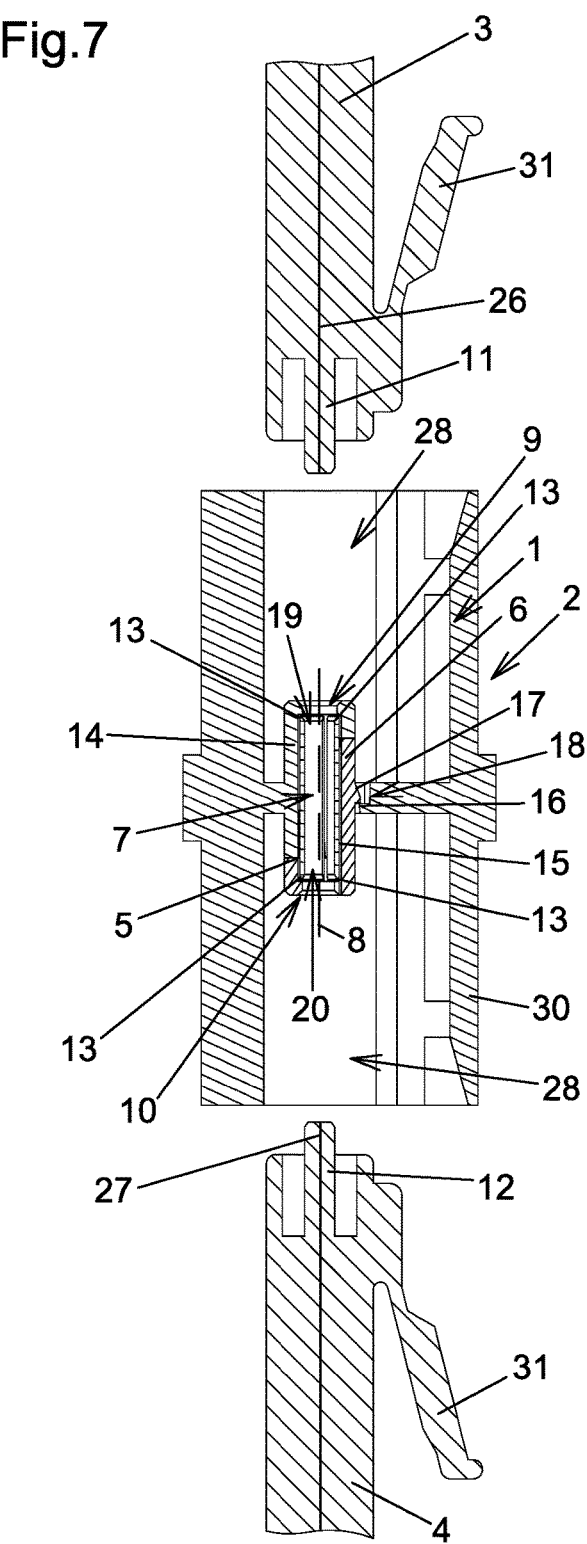
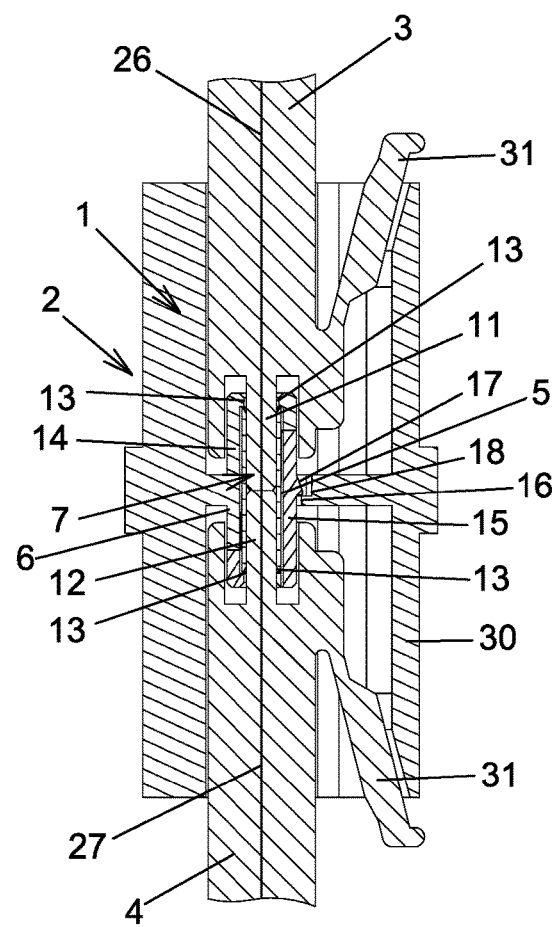
Fig.7
Fig. 8

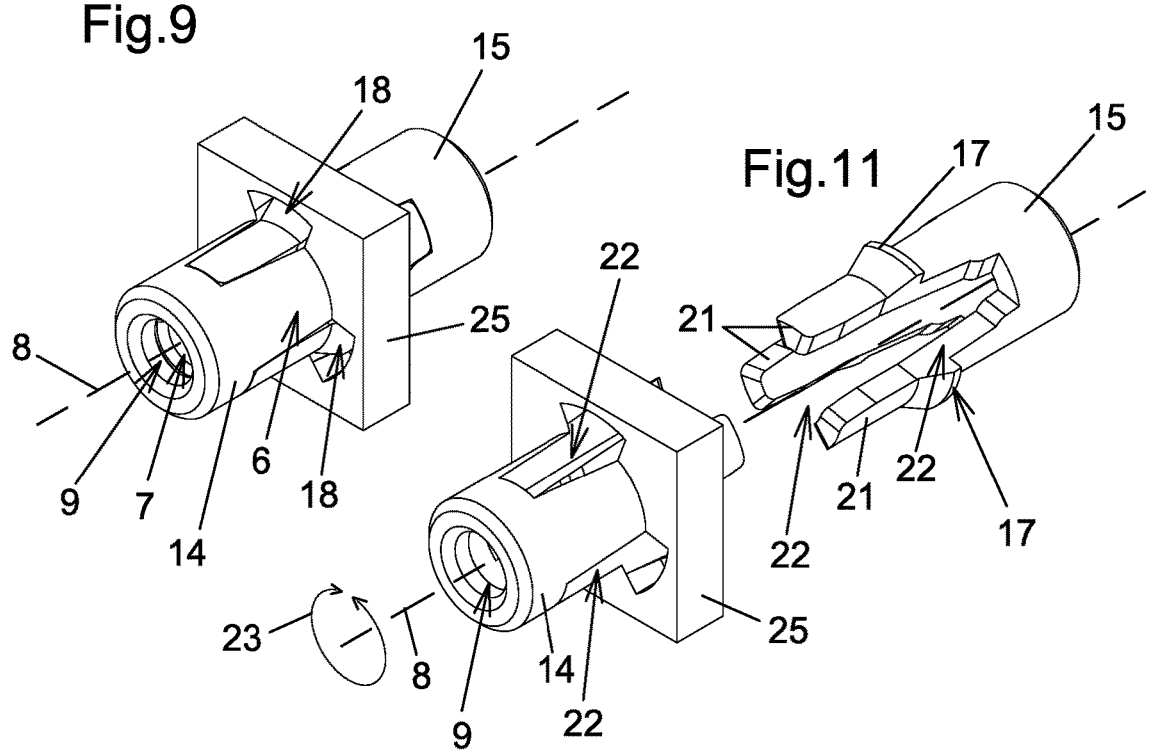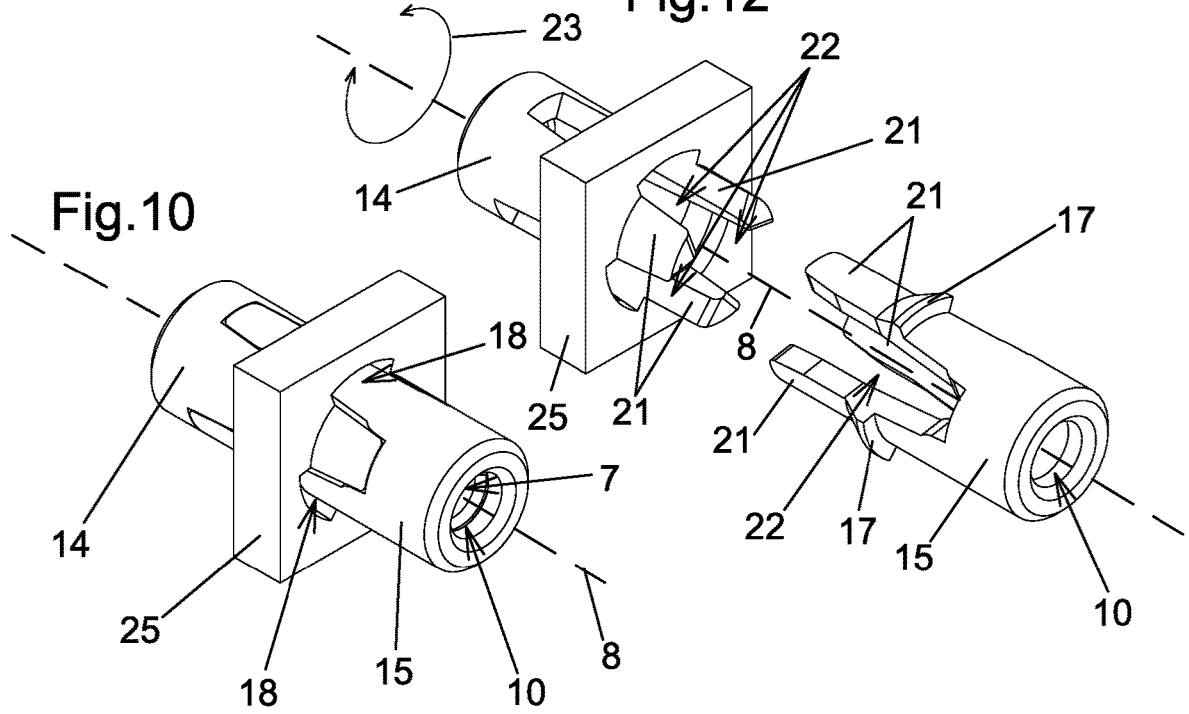

COUPLING FOR FORMING AN OPTICAL PLUG CONNECTION

INCORPORATION BY REFERENCE

The following documents are incorporated herein by reference as if fully set forth: German Patent Application No. 102018117223.0, filed Jul. 17, 2018.

BACKGROUND

The present invention relates to a coupling for forming an optical plug connection between two optical plug connectors, the coupling having a guide sleeve and a sleeve-receiving cage with an interior space for receiving the guide sleeve, the sleeve-receiving cage having plug-in openings which are arranged opposite one another on a longitudinal axis of the sleeve-receiving cage and which serve for the plugging-in of in each case one ferrule of the respective optical plug connector into the guide sleeve in, in each case, one direction parallel to the longitudinal axis, the plug-in openings each being at least regionally surrounded by longitudinal stops of the sleeve-receiving cage for preventing the guide sleeve from being pulled out of the interior space of the sleeve-receiving cage, and the sleeve-receiving cage having two sleeve-receiving cage parts, and the sleeve-receiving cage parts having in each case one detent connection part for forming a detent connection.

In the case of customary commercially available optical plug connectors, provision is generally made for the ferrule to surround at least one light conductor. At the front end of the ferrule, the light conductor is exposed. In order to be able to connect two optical plug connectors to one another such that light signals can be transmitted from the light conductor of one ferrule to the light conductor of the other ferrule, the ferrules and the light conductors arranged therein must be arranged in a very exact manner relative to one another. In general, for this purpose, the ferrules of the two optical plug connectors that are to be connected to one another are connected to one another by means of a corresponding coupling such that the front ends of the ferrules and the light conductors arranged therein bear directly against one another and are correspondingly aligned. To ensure this, in the prior art, couplings for forming an optical plug connection between two optical plug connectors are known which have a sleeve-receiving cage, in the interior space of which there is arranged a guide sleeve. By insertion of the ferrules into the mutually oppositely situated insertion openings of the guide sleeve, the ferrules and thus also the light conductors arranged therein are arranged exactly relative to one another such that the light transmission from one optical plug connector to the other functions. The ferrules of the optical plug connectors are generally mounted in corresponding housings of the optical plug connectors so as to be movable, preferably movable in spring-loaded fashion, such that the guide sleeve can ensure a corresponding alignment of the ferrules relative to one another. In general, the ferrules are held with clamping action in the guide sleeve. Here, in the prior art, it may occur that, when the optical plug connectors are pulled out of the coupling and thus when the ferrules are pulled out of the guide sleeve, the guide sleeve is inadvertently also pulled out of the sleeve-receiving cage. To prevent this, the sleeve-receiving cage has longitudinal stops, normally designed as undercuts, which are intended to retain the ferrules in the interior space of the sleeve-receiving cage. In the case of the coupling and the sleeve-receiving cage being produced in a casting and/or injection-molding process, the production of these longitudinal stops designed as undercuts is generally associated with increased tooling outlay. In order to be able to be demolded, the longitudinal stops or undercuts are often of relatively shallow form, such that, in practice, it is sometimes the case that the guide sleeve is inadvertently pulled together with a ferrule out of the sleeve-receiving cage during the release of the optical plug connection.

In the prior art, couplings of the abovementioned type are also already known in which the sleeve-receiving cage is comprised of two sleeve-receiving cage parts which can be connected to one another by means of a detent connection. In this context, reference is made to WO 2011/128375 A1. In said document, provision is made for the sleeve-receiving cage to be composed of a main part and of a cover which can be slid laterally onto said main part, wherein the cover can be fastened to the main part by means of a detent connection. In the case of the coupling presented in WO 2011/128375 A1, when the cover has been released, the guide sleeve can be inserted into the main part of the sleeve-receiving cage, as can be seen particularly clearly in FIG. 2 of WO 2011/128375 A1.

The possibility of laterally inserting the guide sleeve into the interior space of the sleeve-receiving cage makes it possible for the longitudinal stops to be formed such that the guide sleeve can no longer be inadvertently pulled together with a ferrule out of the sleeve-receiving cage.

This solution, as is realized in WO 2011/128375 A1, can be realized only in the case of couplings in which the sleeve-receiving cage is laterally accessible.

SUMMARY

It is an object of the invention to further develop a coupling of the type mentioned in the introduction such that the sleeve-receiving cage can be installed in the coupling as easily as possible even without the lateral accessibility that is required in the case of the prior art.

This object is achieved by a coupling having one or more features of the invention.

Provision is thus made whereby the detent connection parts for the fastening of the sleeve-receiving cage parts to one another are designed to be engagable into one another with detent action by virtue of the sleeve-receiving cage parts being slid onto one another in a direction parallel to the longitudinal axis.

According to the invention, provision is thus made whereby the detent connection parts are formed on the sleeve-receiving cage parts such that the two sleeve-receiving cage parts can be connected, so as to form the sleeve-receiving cage, by simply being slid onto one another in a direction parallel to the longitudinal axis. The connection of the sleeve-receiving cage parts to form the sleeve-receiving cage is then realized by simple detent engagement of the detent connection parts into one another, such that the detent connection is thus formed. This detent connection may, though need not, be of releasable form, because the assembly process, that is to say the joining-together of the sleeve-receiving cage parts to form the sleeve-receiving cage, generally has to be performed only once during the assembly of the coupling. By means of the invention, it is possible for at least one of the sleeve-receiving cage parts to be slid into the coupling, preferably into the corresponding plug receptacle of the coupling, in the same direction as that in which, after the assembly of the coupling has been completed, at least one of the optical plug connectors is then also slid into the coupling in order to form the optical plug connection. In this way, for the joining-together of the sleeve-receiving cage parts or for the formation of the sleeve-receiving cage, a pathway in the coupling is utilized which must be provided in any case for the insertion of the optical plug connectors into the coupling. Additional lateral access, such as is required in the abovementioned prior art, is thus no longer necessary in the case of the invention. By means of this two-part, or generally speaking multi-part, form of the sleeve-receiving cage by means of two or more sleeve-receiving cage parts the longitudinal stops, which are generally formed as undercuts in the case of the invention too, can be easily formed so as to be solid enough that, in the fully assembled state of the sleeve-receiving cage, they reliably prevent the guide sleeve from being inadvertently pulled together with a ferrule out of the sleeve-receiving cage.

For the sake of completeness, it is pointed out that an optical plug connection is to be understood to mean a plug connection in the case of which at least two optical plug connectors or the ferrules thereof are connected to one another such that the light conductors present in the ferrules are aligned with one another such that the transmission of light signals from one of the optical plug connectors to the other of the optical plug connectors is possible. Here, the coupling is the component into which the optical plug connectors are slid in order to form the optical plug connection. The optical plug connector may have one or else multiple such coupling(s) according to the invention, and may self-evidently be designed in a wide variety of ways. The coupling according to the invention generally serves for connecting two optical plug connectors to one another. It is however also conceivable for the coupling to be configured for example with multiple sleeve-receiving cages and multiple guide sleeves such that more than two optical plug connectors can be connected to one another, preferably in pairwise fashion. The number of components is thus correspondingly increased. In each case only the minimum number of the respective components is stated in the patent claims. This is however merely a linguistic simplification. The invention may also be implemented with a corresponding multiplicity of such components. Where possible and technically expedient, the expression "one" in the patent claims should thus be read in the sense of "at least one", "two" should be read in the sense of "at least two", etc.

The sleeve-receiving cage is that component of the coupling which surrounds the interior space in which the guide sleeve is situated in the fully assembled state of the coupling. The sleeve-receiving cage could correspondingly also be referred to as sleeve-receiving housing or sleeve-receiving body or the like. The guide sleeve serves for correctly mutually aligning, or in other words centering, the ferrules of the optical plug connectors that are to be connected to one another. The guide sleeve could correspondingly also be referred to as centering sleeve. The plug-in openings of the sleeve-receiving cage are arranged opposite one another and lie on a longitudinal axis of the sleeve-receiving cage, whereby said longitudinal axis is then also predefined. In the state in which the optical plug connectors have been plugged into the coupling in order to form the optical plug connection, the light conductors in the ferrules lie, in preferred design variants, on said longitudinal axis of the sleeve-receiving cage. For the sake of completeness, it is pointed out that the longitudinal axis is not a physically actually present component but is rather an imaginary straight line on which the plug-in openings are arranged.

The longitudinal stops of the sleeve-receiving cage which retain the guide sleeve in the interior space of the sleeve-receiving cage surround the plug-in openings of the sleeve-receiving cage at least in regions and are expediently designed as undercuts. The sleeve-receiving cage parts, and also a corresponding coupling housing of the coupling, may be formed from plastic, or else from metal or even from ceramic. These components are particularly preferably manufactured inexpensively as injection-molded parts. One of the sleeve-receiving cage parts may also be formed integrally with the coupling housing of the coupling. The guide sleeve may be manufactured for example from metal, ceramic or else from plastic. The guide sleeve for holding the ferrules firmly with clamping action is expediently designed to be elastically deformable. In preferred embodiments, the guide sleeve may be designed as a tube, that is to say as a cylindrical-shell-shaped body, in particular of a circular cylinder. The elasticity of the guide sleeve may be realized by means of the material alone. It is however also possible, as is known per se from the prior art, for a longitudinal slot to be provided in the guide sleeve in order to impart the required elastic deformability to the guide sleeve. Preferred embodiments of the guide sleeve are formed as a longitudinally slotted tube. On the mutually opposite ends of the guide sleeve, there is expediently situated in each case one insertion opening for the plugging-in or insertion of in each case one ferrule of an optical plug connector into the guide sleeve. Preferred variants provide that the guide sleeve is, in the detent-engaged state of the detent connection, mounted with play, or in other words so as to be movable relative to the sleeve-receiving cage, in the interior space of the sleeve-receiving cage. The play preferably exists both in a direction along the longitudinal axis of the sleeve-receiving cage and in directions orthogonal with respect thereto. In this way, the guide sleeve, in particular when the ferrules are inserted into it, can be moved within the sleeve-receiving cage relative to the sleeve-receiving cage in order to thus ensure the optimum alignment of the two ferrules of the optical plug connectors that are to be connected to one another. It is however alternatively or additionally also possible in this context for the sleeve-receiving cage to be arranged so as to be movable and thus with play in the coupling housing of the coupling. For the sake of completeness, it is pointed out that, even in the variants in which the guide sleeve is mounted with play in the interior space of the sleeve-receiving cage, the longitudinal stops which surround the plug-in openings of the sleeve-receiving cage can be designed so as to reliably ensure that the guide sleeve cannot inadvertently be pulled together with a ferrule out of the sleeve-receiving cage or the interior space thereof.

Couplings according to the invention are particularly preferably designed for interconnecting optical plug connectors of PC (physical contact) type. The invention may self-evidently also be used for forming optical plug connections with other types of optical plugs.

Preferred variants of the invention provide for at least one of the sleeve-receiving cage parts to have at least one protruding lug and for the other of the sleeve-receiving cage parts to have at least one lug receptacle corresponding to the lug, the lug being slidable into the lug receptacle during the sliding of the sleeve-receiving cage parts onto one another in the direction parallel to the longitudinal axis. An automatic alignment of the sleeve-receiving cage parts relative to one another as they are slid onto one another can be realized by means of the sliding of the lugs into the lug receptacles. The lug could also be referred to as projection of the sleeve-receiving part. The lug receptacle is generally formed as a recess in a corresponding wall of the sleeve-receiving part, into which recess said lug or said projection can be slid. Lugs and lug receptacles may basically assume different forms. Preferred variants provide for the lugs to be formed so as to be tapered in the direction of their free ends. It is also expedient for the lugs to be formed symmetrically with respect to an axis of symmetry which, in the assembled state of the sleeve-receiving cage, runs parallel to the longitudinal axis of the sleeve-receiving cage. The same expediently applies to the lug receptacles.

In preferred variants of the invention, in the fully assembled state of the sleeve-receiving cage, the lugs and the lug receptacles, corresponding thereto, of the sleeve-receiving cage parts expediently bear regionally in positively locking fashion against one another. In this context, provision is preferably made whereby, in the detent-engaged state of the detent connection, in a direction parallel to the longitudinal axis and/or in a circumferential direction around the longitudinal axis, the lug bears regionally in positively locking fashion against a corresponding wall portion, which delimits the lug receptacle, of the other of the sleeve-receiving cage parts. Preferred variants also provide for the sleeve-receiving cage parts that are respectively to be connected to one another to each have at least one protruding lug and at least one lug receptacle. The lug receptacles may for example be arranged in each case between two lugs of the respective sleeve-receiving cage part. It is also expedient if the detent connection part is formed on the lug, preferably in a middle third of the lug as viewed along the longitudinal axis. In these embodiments, the lugs thus protrude beyond the respective detent connection part of the sleeve-receiving cage part in both directions parallel to the longitudinal axis. If the detent connection part is formed on the lug, preferred variants provide for the lug to be unconstrained in the region of the detent connection part. Here, unconstrained means that, in the region of the detent connection part, the lug does not bear against anything in such a way that, during the detent engagement and disengagement of the detent connection parts, the lug can be elastically deflected, that is to say in other words can deflect, in this region. It can thus also be stated that the lug is unconstrained for elastic deflection in the region of the detent connection part.

It is basically conceivable for one of the sleeve-receiving cage parts to have only one lug and for the other of the sleeve-receiving cage parts to have only one sleeve receptacle, or for both sleeve-receiving cage parts to each have only one lug and one lug receptacle. Preferred variants of the invention however provide that at least one of the sleeve-receiving cage parts has two or three or more protruding lugs and the other of the sleeve-receiving parts has a number of lug receptacles corresponding to the number of lugs.

Provision may be made whereby, on one of the sleeve-receiving cage parts, there is arranged a wall which projects normally from the sleeve-receiving cage part outward in relation to the longitudinal axis. This may basically also be the case on both, or on all, of the sleeve-receiving cage parts that are to be connected to one another. It is however generally sufficient for this to be thus realized on exactly one of the sleeve-receiving cage parts. The outwardly projecting wall may be formed integrally on the sleeve-receiving cage part, that is to say may be part of the sleeve-receiving cage part. The wall may serve for the connection of the sleeve-receiving cage part to the coupling housing of the coupling. Via the wall, one of the sleeve-receiving cage parts may also be connected fixedly, preferably integrally, to the coupling housing. The other sleeve-receiving cage part may then, according to the invention, by means of the sliding onto one another in a direction parallel to the longitudinal axis, be fastened to the sleeve-receiving cage part which is fastened via the wall to the coupling housing. Preferred variants provide for the detent connection part of said one of the sleeve-receiving cage parts to be formed on the wall which is formed integrally on said sleeve-receiving cage part. The wall may, as already stated above, be part of the coupling housing of the coupling. The wall may surround the sleeve-receiving cage part in a circumferentially closed manner.

A coupling housing of the coupling expediently has mutually oppositely situated receiving channels for in each case one of the optical plug connectors. The optical plug connectors may, as is known per se, be detachably fastenable in the receiving channel on the coupling housing by corresponding connecting elements such as for example detents, screw connection or the like.

Aside from the coupling itself, the invention also relates to an optical plug connection having two optical plug connectors and one coupling according to the invention, in each case one ferrule of the respective optical plug connector being plugged into the guide sleeve in in each case one direction parallel to the longitudinal axis through one of the plug-in openings of the sleeve-receiving cage, the guide sleeve aligning the ferrules of the optical plug connectors with their respective light conductors relative to one another.

The light conductors arranged in the ferrules may be light-conducting fibers or else other light conductors known per se for transmitting optical signals.

BRIEF DESCRIPTION OF THE DRAWINGS

Further features and details of preferred embodiments of the invention will be discussed by way of example below on the basis of the design variant according to the invention shown in the figures, in which:

FIG. 5 shows an exploded illustration of an optical plug connection having the coupling as per FIG. 1;

FIG. 6 shows an exploded illustration of the coupling as per FIG. 1;

FIG. 7 shows a longitudinal section through the optical plug connection with a coupling according to the invention before the optical plug connectors have been slid into the coupling;

FIG. 8 shows a longitudinal section through a correspondingly fully formed optical plug connection in which the optical plug connectors have been plugged into the coupling;

FIGS. 9 to 12 show detail illustrations of the sleeve-receiving cage;

DETAILED DESCRIPTION

Figure 1:
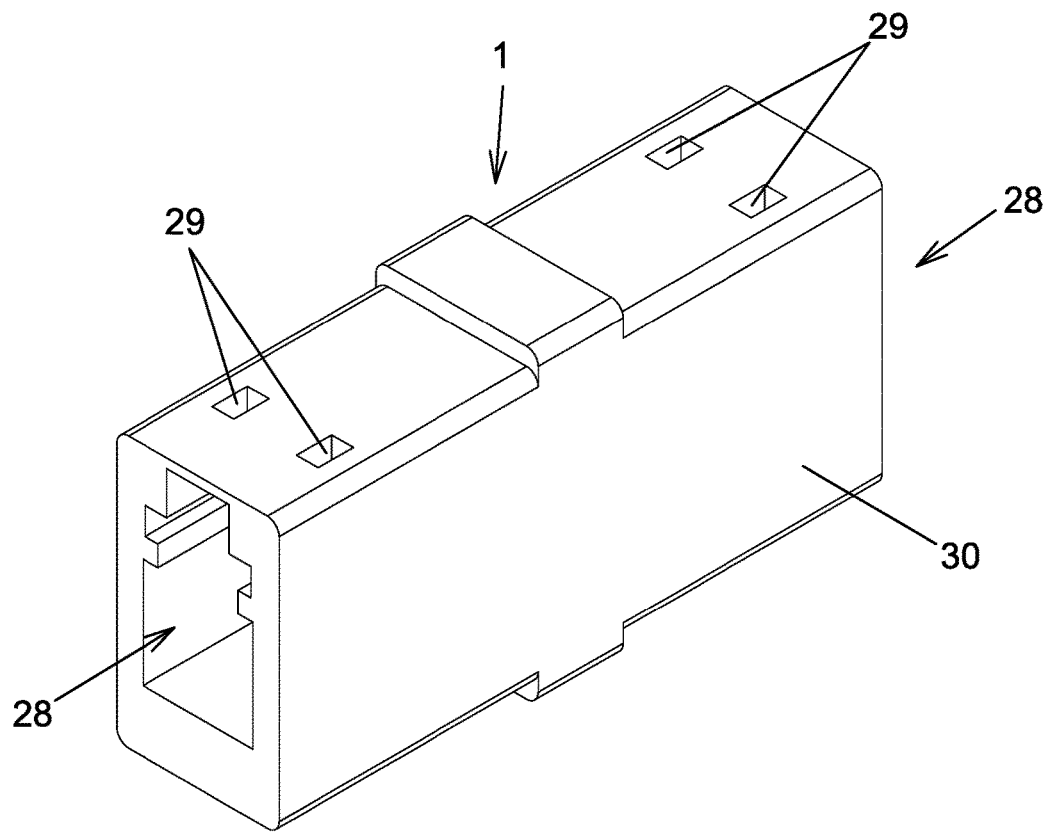
FIG. 1 shows a perspective exterior view of a coupling according to the invention.

The coupling 1 illustrated in FIG. 1 for forming an optical plug connection 2 is a simple embodiment which serves for connecting two optical plug connectors 3 and 4 to one another in light-conducting fashion. For this purpose, the optical plug connectors 3 and 4 are inserted on mutually opposite sides into the respective plug receptacle 28 of the coupling housing 30. The catches 31 which are illustrated in FIG. 5 and formed on the respective optical plug connector 3 and 4 can engage with detent action into the arresting holes 29 in order to thus releasably hold the respective optical plug connectors 3 and 4 firmly in the respective plug receptacle 28 of the coupling housing 30. This is known per se and does not need to be discussed in any more detail. Instead of the detent connection between the catches 31 and the arresting holes 29, it would self-evidently also be possible for other means known per se from the prior art to be provided in order to secure the respective optical plug connectors 3 and 4 in the plug receptacle 28 so as to prevent them from being inadvertently pulled out. This type of locking is in any case generally of releasable form in order to enable the optical plug connectors 3 and 4 to also be pulled out of the coupling housing 30 again in order to release the optical plug connection 2.

The variant shown here in this exemplary embodiment is a very simple embodiment of the coupling 1 according to the invention, in the case of which only two optical plug connectors 3 and 4 are connected to one another. As already discussed in the introduction, couplings 1 according to the invention may also be designed such that more than two optical plug connectors 3 and 4 can be connected to one another, in particular in pairwise fashion. It is self-evidently also possible for optical plug connections 2 to be realized in the case of which multiple such couplings 1 are used in order to connect a correspondingly large number of optical plug connectors 3 and 4 in light-conducting fashion to one another, preferably in pairwise fashion.

Figure 2:
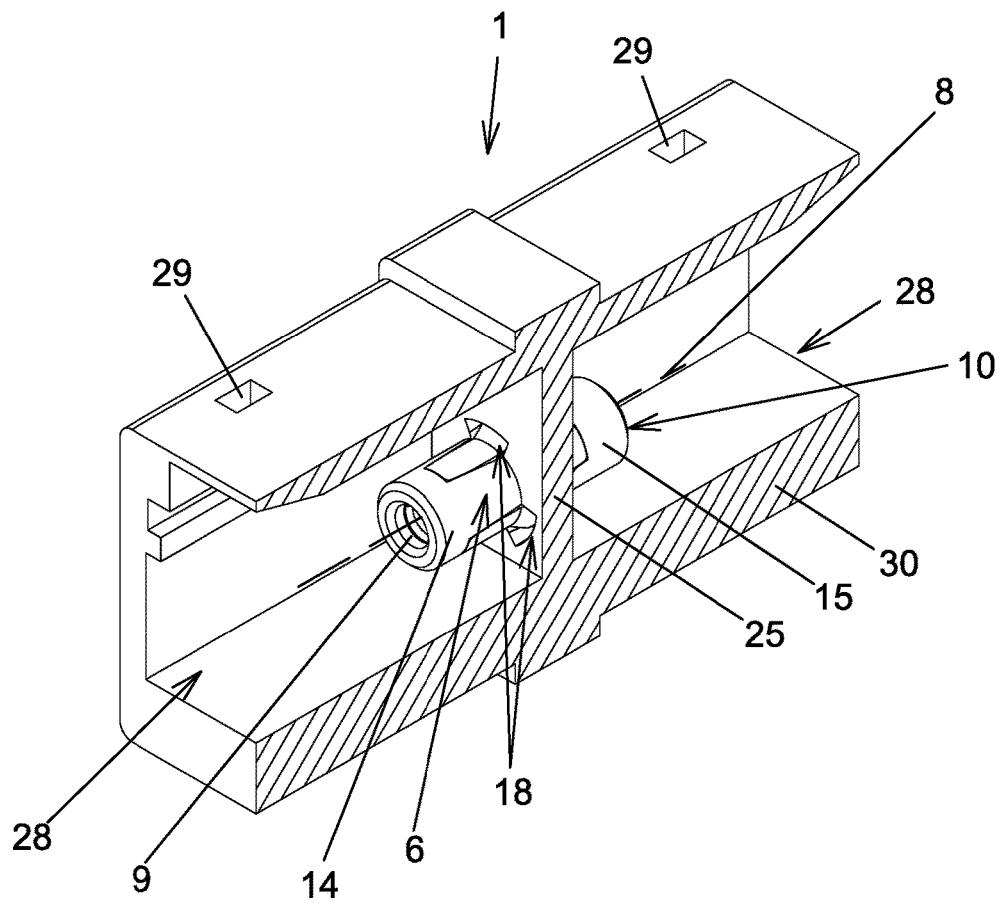
FIG. 2 shows a longitudinal section in the fully assembled state of the sleeve-receiving cage of said coupling as per FIG. 1.
Figure 3:
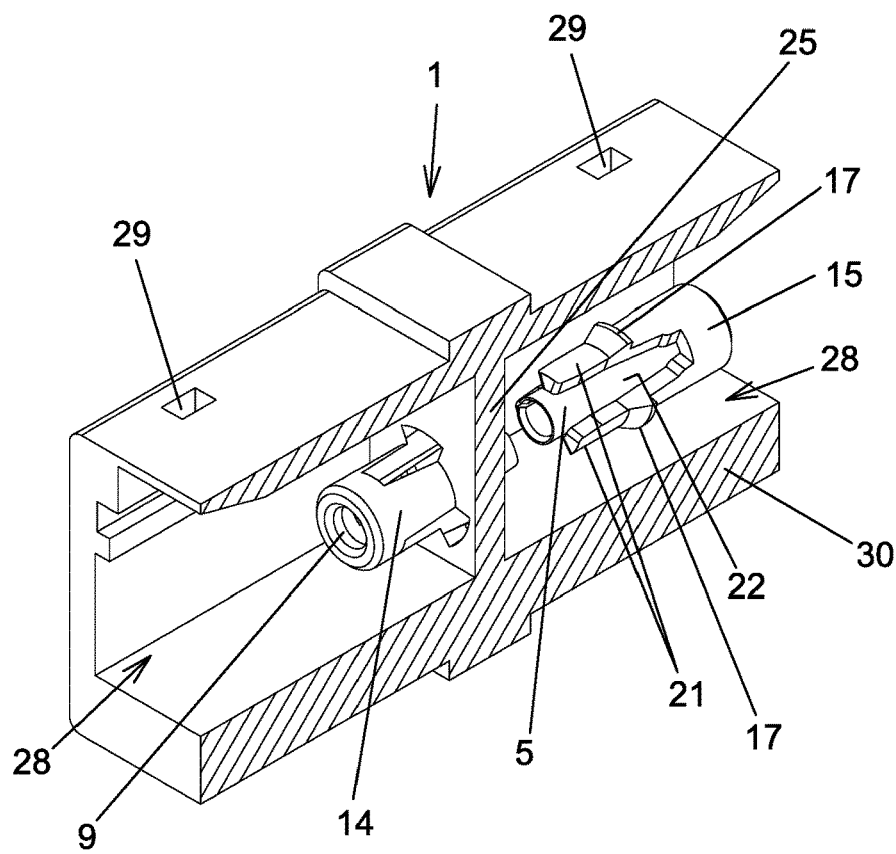
FIGS. 3 and 4 show longitudinal sections corresponding to FIG. 2 during the assembly process from two different perspectives.
Figure 4:
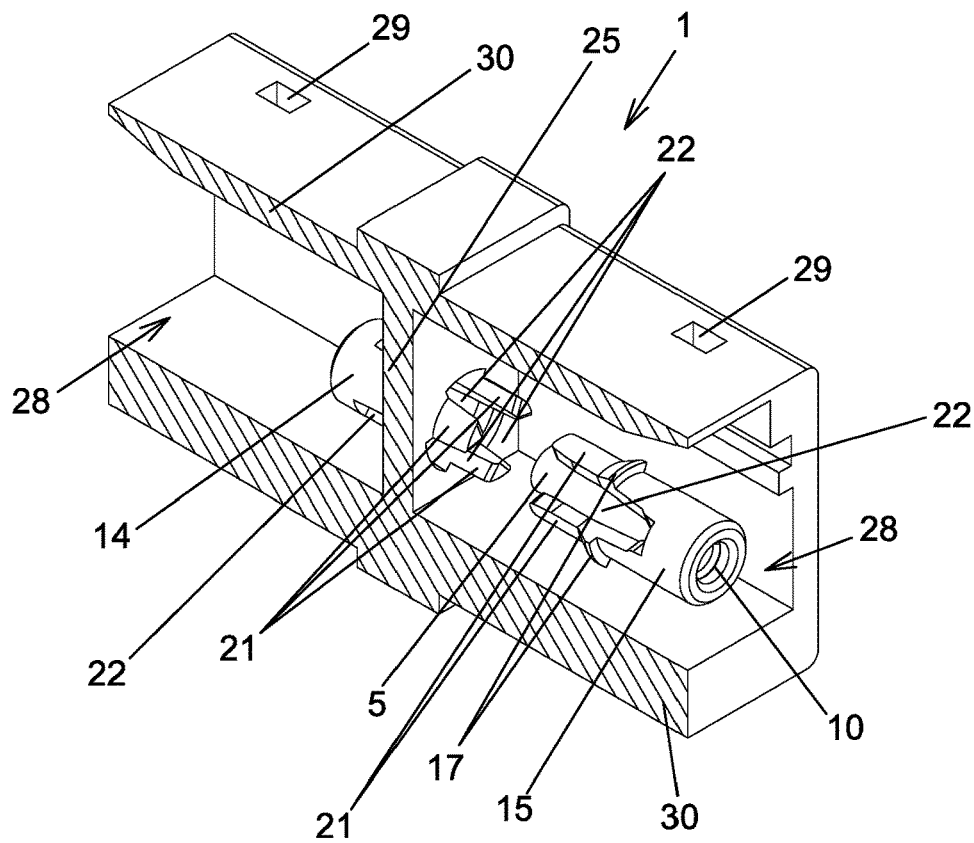

FIGS. 2 to 4 each show a longitudinal section through the coupling 1 from FIG. 1. In FIG. 2, the sleeve-receiving cage 6 has been fully assembled. The sleeve-receiving cage parts 14 and 15 have thus been slid onto one another in a direction parallel to the longitudinal axis 8 to such an extent that their respective detent connection parts 16 and 17 have engaged into one another with detent action in order to form the detent connection 18. FIGS. 3 and 4 show, from two different perspectives, the situation before the sleeve-receiving cage parts 14 and 15 have been slid onto one another in the direction parallel to the longitudinal axis 8.

In the exemplary embodiment shown, the wall 25 which projects from the sleeve-receiving cage part 14 outward in a direction normal with respect to the longitudinal axis 8 has been formed integrally on the sleeve-receiving cage part 14 and is also an integral part of the coupling housing 30, such that the sleeve-receiving cage part 14 is integrally connected to the coupling housing 30. As already discussed in the introduction, it is however self-evidently not imperatively necessary for provision to thus be made for this. It is also possible for both sleeve-receiving cage parts 14 and 15 to be formed initially separately from the wall 25 and to be connected to one another, and to the coupling housing 30 and the wall 25, for the first time as a result of the detent engagement of their detent connection parts 16 and 17. In FIG. 2, it can in any case be seen that the detent connection 18 by means of which the sleeve-receiving cage parts 14 and 15 have been connected to form the sleeve-receiving cage 6 are formed in the region of the wall 25. This, too, however self-evidently need not imperatively be the case. The detailed construction of the sleeve-receiving cage parts 14 and 15 will be discussed in detail further below on the basis of FIGS. 9 to 12.

FIG. 5 shows, in a longitudinal section, an exploded illustration of the entire optical plug connection 2 with the two optical plug connectors 3 and 4 known per se, the two sleeve-receiving cage parts 14 and 15, and the guide sleeve 5. It is also possible in FIG. 5 to see the ferrule 12 of the optical plug connector 4 with its light conductor 27 arranged centrally in the ferrule 12. A ferrule 11 with a corresponding light conductor 26 is formed correspondingly on the optical plug connector 3, though this cannot be seen in FIG. 5. In this regard, reference is made to FIGS. 7 and 8, which are discussed further below. The optical plug connectors 3 and 4 may be designed as is known per se from the prior art. They are therefore illustrated merely schematically here. They may, as stated, be for example optical plug connectors of the PC (physical contact) type.

FIG. 6 shows an illustration analogous to FIG. 5, in which, however, the optical plug connectors 3 and 4 have been omitted and only the components of the coupling 1 are shown.

FIG. 7 shows a longitudinal section through the optical plug connectors 2 and 3 and the coupling 1 before the optical plug connectors 2 and 3 are slid into the plug receptacles 28. FIG. 8 shows a longitudinal section through the fully formed optical plug connection 2, in which the optical plug connectors 3 and 4 have been slid into the mutually oppositely situated plug receptacles 28 of the coupling housing 30 to such an extent that their ferrules 11 and 12 have been slid through the plug-in openings 9 and 10 of the sleeve-receiving cage 6 on mutually opposite sides through the insertion openings 19 and 20 of the guide sleeve 5 and thus into the guide sleeve 5. The guide sleeve 5 aligns the ferrules 11 and 12 relative to one another such that the light conductors 26 and 27 of the respective ferrules 11 and 12 are arranged opposite one another such that light signals can be transmitted via the optical plug connection 2 without problems. Here, the guide sleeve 5 ensures corresponding centering of the ferrules 11 and 12 such that their light conductors 26 and 27 are optimally aligned with respect to one another. Here, the ferrules 11 and 12 are held with clamping action in the guide sleeve 5, which is of correspondingly elastic form. The guide sleeve 5 is situated in the interior space 7 of the sleeve-receiving cage 6. The longitudinal stops 13, which surround the plug-in opening 9 and 10, of the sleeve-receiving cage 6 prevent the guide sleeve 5 from being able to also be pulled out of the sleeve-receiving cage 6 by one of the ferrules 11 or 12 during the release of the optical plug connection 2. In the fully assembled state as per FIG. 8, the light conductors 26 and 27 of the ferrules 11 and 12 lie, in preferred embodiments such as that shown here, on the longitudinal axis 8.

FIGS. 9 to 12 illustrate only the two sleeve-receiving cage parts 14 and 15. FIGS. 9 and 10 show the sleeve-receiving cage parts 14 and 15, which have been connected to one another to form the sleeve-receiving cage 6, from two different perspective views. FIGS. 11 and 12 each show, from these views, the state in which the sleeve-receiving cage parts 14 and 15 are still separate from one another.

As already discussed, in this exemplary embodiment, provision is made whereby the wall 25 which projects normally with respect to the longitudinal axis 8 is formed integrally on one of the sleeve-receiving cage parts, in this case on the sleeve-receiving cage part 14. In the exemplary embodiment shown, both sleeve-receiving cage parts 14 and 15 each have lugs and lug receptacles 22 arranged in between. As the sleeve-receiving cage parts 14 and 15 are slid onto one another in the direction parallel to the longitudinal axis 8, the respective lugs 21 are slid into the lug receptacles 22 corresponding thereto, which automatically also ensures a corresponding alignment of the sleeve-receiving cage parts 14 and 15 with one another in the circumferential direction 23. It can be clearly seen in FIGS. 11 and 12 that the detent connection parts 17, which are formed here as protruding detent lugs, of the sleeve-receiving cage part 15 are formed on the respective lug 21 in the middle third thereof. That is to say, the lugs 21 extend to both sides of the respective detent connection part 17. In the exemplary embodiment shown, the detent connection parts 16 of the sleeve-receiving cage part 14 are formed in the wall 25, which in this case constitutes a part of the sleeve-receiving part 14, as can be seen particularly clearly in FIGS. 13 and 14. This self-evidently need not be the case. The detent connection parts 16 of the sleeve-receiving cage part 14 may also be formed at another location of the sleeve-receiving cage part 14. The detent connection parts 17 of the sleeve-receiving cage part 15 must then be formed at a corresponding location in order that the detent connection(s) 18 can be formed by detent engagement of the detent connection parts 16 and 17 into one another.

Proceeding from FIGS. 11 and 12, in this exemplary embodiment, the sleeve-receiving cage part 15 is slid onto the sleeve-receiving cage part 14 in a direction parallel to the longitudinal axis 8, resulting in the detent engagement of the detent connection parts 16 and 17 and thus in the formation of the detent connections 18, whereby the sleeve-receiving cage 6 can be fully assembled in a simple manner. The guide sleeve 5 (not illustrated in FIGS. 9 to 12) is self-evidently firstly inserted such that it is arranged, in the fully assembled sleeve-receiving cage 6, in the interior space 7 thereof.

Figure 13:
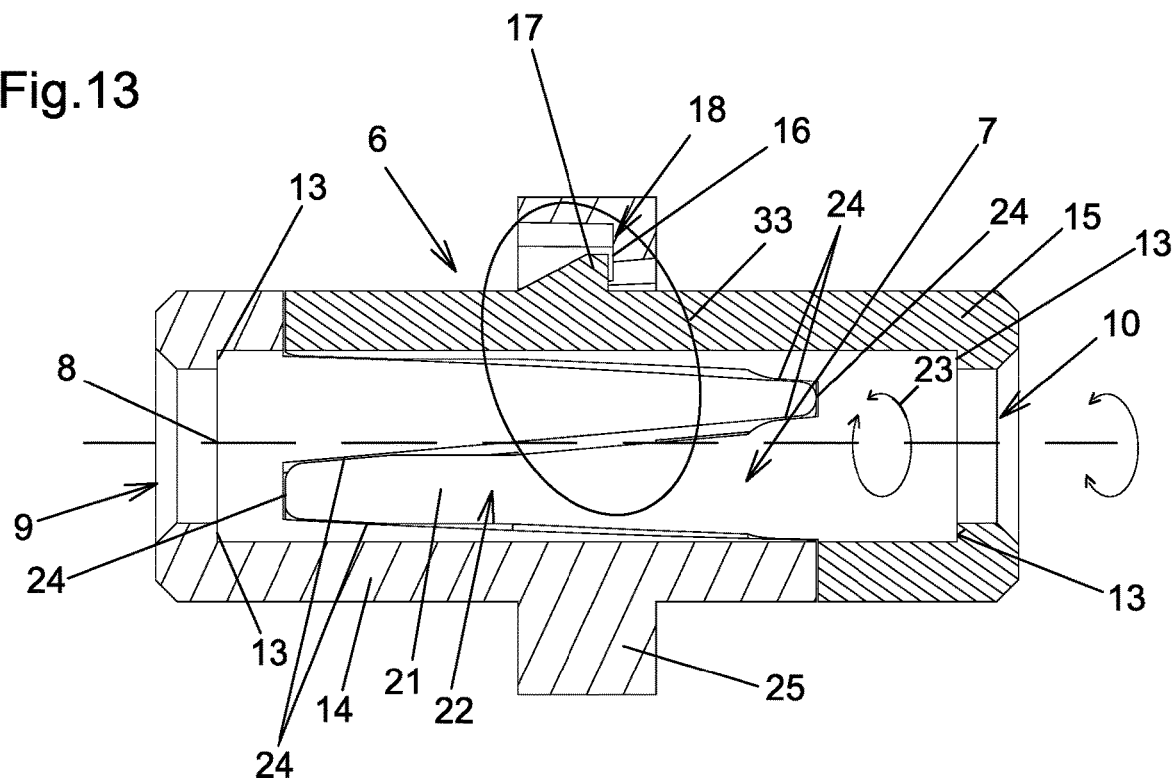
FIG. 13 shows a longitudinal section through the connected-together sleeve-receiving cage parts without guide sleeve.

FIG. 13 shows a longitudinal section through the fully assembled sleeve-receiving cage 6, with the guide sleeve 5 in the interior space 7 not being illustrated. It can be clearly seen here how the lugs 21 of the respective sleeve-receiving cage part 14 or 15 engage into the lug receptacles 22 of the respective other sleeve-receiving cage part 14 and 15. In particular, it can be seen that, in the detent-engaged state of the detent connection 18 as illustrated in FIG. 13, in a direction parallel to the longitudinal axis 8 and in this example also in a circumferential direction 23 around the longitudinal axis 8, the lugs 21 bear regionally in positively locking fashion against the respective wall portions 24, which delimit the lug receptacle 22, of the respective other of the sleeve-receiving cage parts 14 and 15. By means of these instances of positive locking, the sleeve-receiving cage parts 14 and 15 are fixedly fastened to one another both in the directions parallel to the longitudinal axis 8 and in the circumferential directions 23 when the detent connection 18 has been correspondingly formed by engagement of the detent connection parts 16 and 17 into one another.

As already discussed in the introduction, the lug 21 is expediently unconstrained in the region 33 of the detent connection part 17. This absence of constraint, that is to say the absence of abutment against anything else, in this case in particular against the wall portion 24, has the advantage that, or should be configured such that, the lug 21 can be elastically deflected, that is to say in other words can deflect, in this region 33 during the detent engagement and disengagement of the detent connection parts 16 and 17.

Figure 14:
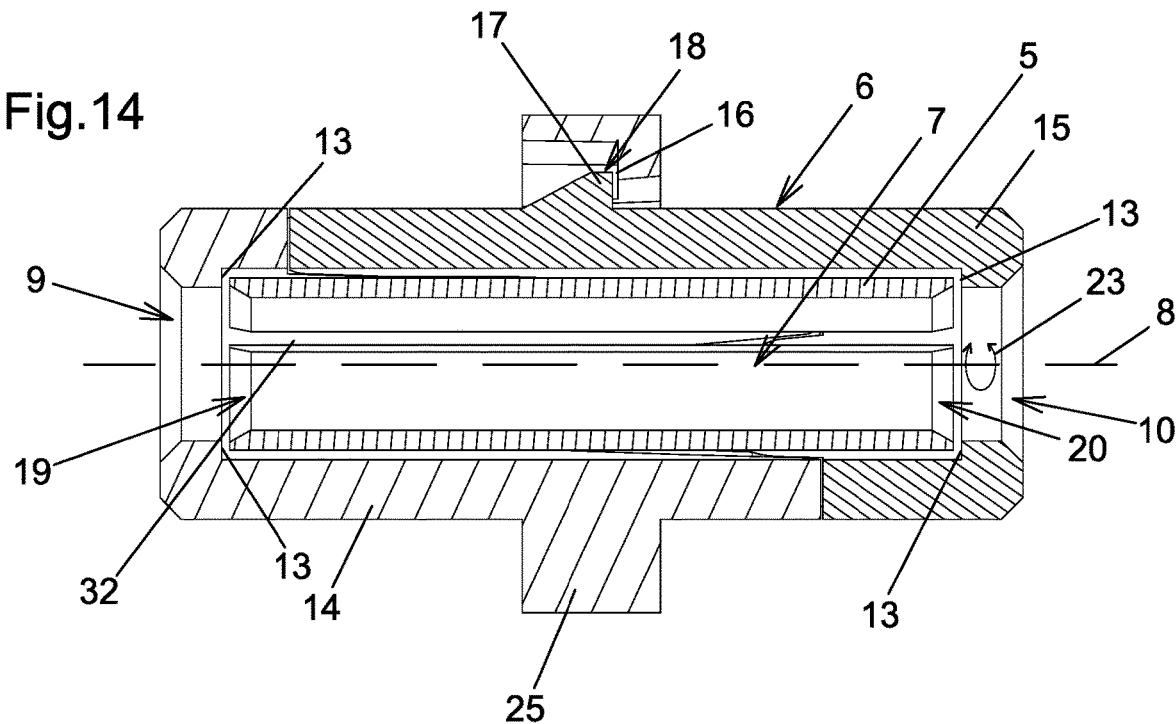
FIG. 14 shows a longitudinal section through the connected-together sleeve-receiving cage parts, wherein the guide sleeve is arranged in the interior space of the sleeve-receiving cage.

FIG. 14 additionally illustrates the guide sleeve 5 in the interior space 7 of the sleeve-receiving cage 6. In this longitudinal section, it is possible to clearly see the longitudinal slot 32 of the guide sleeve 5, which longitudinal slot permits an elastic expansion of the guide sleeve 5 when the ferrules 11 and 12 are slid through the plug-in opening 9 and 10 of the sleeve-receiving cage 6 into the insertion openings 19 and 20 of the guide sleeve 5. The longitudinal stops 13, which are formed as undercuts on the respective sleeve-receiving cage parts 14 and 15, surround the plug-in openings 9 and 10 and prevent the guide sleeve 5 from being able to be pulled together with one of the ferrules 11 and 12 out of the interior space 7 in a direction parallel to the longitudinal axis 8. In FIG. 14, it is also possible to clearly see that, in preferred embodiments as shown here, the guide sleeve 5 is mounted with play, and thus so as to be movable in the interior space 7 of the sleeve-receiving cage 6, even in the detent-engaged state of the detent connection 18. Owing to this mobility in the interior space 7, the guide sleeve 5 can optimally mutually align the ferrules 11 and 12 of the optical plug connectors 3 and 4 that are to be connected to one another. As already discussed in the introduction, it would alternatively or additionally be possible to provide for the entire sleeve-receiving cage 6 to be mounted movably on the coupling housing 30. In these embodiments, the guide sleeve 5 may then possibly also be mounted without play, that is to say fixedly, in the interior space 7 of the sleeve-receiving cage 6.

| List of Reference Designations: | |
|---|---|
| 1 | Coupling |
| 2 | Optical plug connection |
| 3 | Optical plug connector |
| 4 | Optical plug connector |
| 5 | Guide sleeve |
| 6 | Sleeve-receiving cage |
| 7 | Interior space |
| 8 | Longitudinal axis |
| 9 | Plug-in opening |
| 10 | Plug-in opening |
| 11 | Ferrule |
| 12 | Ferrule |
| 13 | Longitudinal stop |
| 14 | Sleeve-receiving cage part |
| 15 | Sleeve-receiving cage part |
| 16 | Detent connection part |
| 17 | Detent connection part |
| 18 | Detent connection |
| 19 | Insertion opening |
| 20 | Insertion opening |
| 21 | Lug |
| 22 | Lug receptacle |
| 23 | Circumferential direction |
| 24 | Wall portion |
| 25 | Wall |
| 26 | Light conductor |
| 27 | Light conductor |
| 28 | Plug receptacle |
| 29 | Arresting hole |
| 30 | Coupling housing |
| 31 | Catch |
| 32 | Longitudinal slot |
| 33 | Region |

The invention claimed is:

1. A coupling for forming an optical plug connection between two optical plug connectors, the coupling comprising:
   a guide sleeve;
   a sleeve-receiving cage with an interior space for receiving the guide sleeve, the sleeve-receiving cage having plug-in openings which are arranged opposite one another on a longitudinal axis of the sleeve-receiving cage and which serve for the plugging-in of in each case one ferrule of the respective optical plug connector into the guide sleeve in, in each case, one direction parallel to the longitudinal axis;

longitudinal stops of the sleeve-receiving cage at least regionally surround each of the plug-in openings, the longitudinal stops of the sleeve-receiving cage are adapted to prevent the guide sleeve from being pulled out of the interior space of the sleeve-receiving cage; and the sleeve-receiving cage having two sleeve-receiving cage parts, and the sleeve-receiving cage parts having in each case one detent connection part for forming a detent connection, the detent connection parts for the fastening of the sleeve-receiving cage parts to one another are engagable into one another with detent action upon the sleeve-receiving cage parts being slid onto one another in the direction parallel to the longitudinal axis.

2. The coupling as claimed in claim 1, wherein the guide sleeve for holding the ferrules with clamping action is elastically deformable.

3. The coupling as claimed in claim 1, wherein the guide sleeve is formed as a longitudinally slotted tube.

4. The coupling as claimed in claim 1, wherein the guide sleeve has, on mutually opposite ends, in each case one insertion opening for plugging-in of in each case one of the ferrules.

5. The coupling as claimed in claim 1, wherein the guide sleeve is, in a detent-engaged state of the detent connection, mounted with play in the interior space of the sleeve-receiving cage.

6. The coupling as claimed in claim 1, wherein at least one of the sleeve-receiving cage parts has at least one protruding lug and the other of the sleeve-receiving cage parts has at least one lug receptacle corresponding to the lug, the lug being slidable into the lug receptacle during the sliding of the sleeve-receiving cage parts onto one another in the direction parallel to the longitudinal axis.

7. The coupling as claimed in claim 6, wherein, in the detent-engaged state of the detent connection, in at least one of a direction parallel to the longitudinal axis or in a circumferential direction around the longitudinal axis, the lug bears regionally in positively locking fashion against a corresponding wall portion, which delimits the lug receptacle, of the other of the sleeve-receiving cage parts.

8. The coupling as claimed in claim 6, wherein each of the sleeve-receiving cage parts has in each case at least one of the protruding lugs and at least one of the lug receptacles.

9. The coupling as claimed in claim 6, wherein the detent connection part is formed on the lug.

10. The coupling as claimed in claim 9, wherein the detent connection part is formed in a middle third of the lug as viewed along the longitudinal axis.

11. The coupling as claimed in claim 6, wherein at least one of the sleeve-receiving cage parts has two or three or more of the protruding lugs and the other of the sleeve-receiving parts has a number of the lug receptacles corresponding to a number of the lugs.

12. The coupling as claimed in claim 1, wherein, on one of the sleeve-receiving cage parts, there is arranged a wall which projects normally from the sleeve-receiving cage part outward in relation to the longitudinal axis.

13. The coupling as claimed in claim 12, wherein the wall is integrally formed on the one of the sleeve-receiving cage parts.

14. An optical plug connection having two optical plug connectors and one coupling as claimed in claim 1, in each case one ferrule of the respective optical plug connector is plugged into the guide sleeve in, in each case, the one direction parallel to the longitudinal axis through one of the plug-in openings of the sleeve-receiving cage, the guide sleeve aligning the ferrules of the optical plug connectors with their respective light conductors relative to one another.

* * * * *